US012655039B2

(12) United States Patent　　　　(10) Patent No.:　US 12,655,039 B2
Cox et al.　　　　　　　　　　　　　(45) Date of Patent:　　Jun. 16, 2026

(54) ADVANCED ROTATIONAL HYDRODYNAMIC CAVITATION SYSTEM FOR THE IRREVERSIBLE REMOVAL OF BACTERIA, PATHOGENS, VIRUSES, AND CHEMICAL BONDS

(71) Applicant: Phoenix Lake, Inc., St. George, UT (US)

(72) Inventors: Jamie Cox, St. George, UT (US); Tané Remington, Livermore, CA (US)

(73) Assignee: 8215 Technology Inc., St. George, UT (US)

( * ) Notice: Subject to any disclaimer, the term of this patent is extended or adjusted under 35 U.S.C. 154(b) by 294 days.

(21) Appl. No.: 18/357,548

(22) Filed: Jul. 24, 2023

(65) Prior Publication Data

US 2024/0391801 A1　　Nov. 28, 2024

Related U.S. Application Data

(60) Provisional application No. 63/504,413, filed on May 25, 2023.

(51) Int. Cl.
　　*C02F 1/34*　　　　(2023.01)
　　*B01D 21/28*　　　　(2006.01)
　　*C02F 101/20*　　　(2006.01)
(52) U.S. Cl.
　　CPC .............. *C02F 1/34* (2013.01); *B01D 21/283*
　　　　(2013.01); *C02F 2101/20* (2013.01); *C02F*
　　　　　　　　　　　　　　　　*2303/04* (2013.01)
(58) Field of Classification Search
　　CPC ...... B01D 21/283; C02F 1/34; C02F 2101/20;
　　　　　　　　　　　　　　　　　　C02F 2303/04
　　See application file for complete search history.

(56) References Cited

U.S. PATENT DOCUMENTS 2,568,536　A　　9/1951　Sidney
3,476,219　A　　11/1969　Lauer
　　　　　　　　(Continued)

FOREIGN PATENT DOCUMENTS

CA　　　　3023102　A1　　11/2016
CA　　　　3081337　A1　　5/2019
　　　　　　　　(Continued)

OTHER PUBLICATIONS

Chen, Y, et al. Application of hydrodynamic cavitation in the field of water treatment. Chemical Papers [online], Mar. 4, 2023 (retrieved on Feb. 10, 2026). Retrieved from Internet: https://link.springer.com/article/10.1007/s11696-023-02754-y>DOI: 10.1007/s11696-023-02754-y>.

(Continued)

*Primary Examiner* — Patrick Orme
(74) *Attorney, Agent, or Firm* — Gurr & Brande, PLLC; Robert A. Gurr

(57)　　　　　　ABSTRACT

A hydrodynamic cavitation system features a first stator, a second stator, a third stator, and a rotor, each having a plurality of indentations. The hydrodynamic cavitation system further includes a drive shaft, a variable speed motor, and a pump, wherein the pump circulates fluid through the hydrodynamic cavitation system while the drive shaft actuates the rotor, generating hydrodynamic cavitation between each stator and the rotor. Each of the plurality of indentations provides different regions to optimize overall hydrodynamic cavitation volume, increasing cavitation locations, which can coalesce to become a macro cavitation site and cavitation cloud. The hydrodynamic cavitation system removes bacteria, pathogens, viruses, fungi, cyanobacteria as well as breaks chemical bonds, effectively treating contaminated water and other fluids.

18 Claims, 10 Drawing Sheets

(56) References Cited

U.S. PATENT DOCUMENTS

| | | | |
|---|---|---|---|
| 5,279,262 | A | 1/1994 | Muehleck |
| 5,732,891 | A | 3/1998 | Langenecker |
| 6,601,787 | B1 | 8/2003 | Langenecker |
| 6,651,914 | B1 | 11/2003 | Langenecker |
| 7,306,737 | B2 | 12/2007 | Langenecker |
| 7,770,830 | B1 | 8/2010 | Langenecker et al. |
| 8,021,557 | B2 | 9/2011 | Langenecker et al. |
| 10,864,495 | B1 | 12/2020 | Zucca et al. |
| 2004/0232006 | A1 | 11/2004 | Kazem |
| 2007/0140052 | A1 | 6/2007 | Kozyuk |
| 2008/0236160 | A1 | 10/2008 | Glotov |
| 2011/0300568 | A1 | 12/2011 | Parsheh et al. |
| 2014/0316180 | A1 | 10/2014 | Fomitchev-Zamilov |
| 2016/0052621 | A1 | 2/2016 | Ireland et al. |
| 2016/0082405 | A1* | 3/2016 | Fomitchev-Zamilov .................... B01J 19/008 251/304 |
| 2016/0167983 | A1* | 6/2016 | Sirok ................. B01F 27/2712 422/127 |
| 2016/0175791 | A1 | 6/2016 | Kozyuk |
| 2016/0185624 | A1 | 6/2016 | Miller |
| 2018/0369470 | A1 | 12/2018 | Garvey |
| 2020/0399147 | A1 | 12/2020 | Yost et al. |
| 2021/0086147 | A1 | 3/2021 | Smotritskiy |
| 2021/0180833 | A1 | 6/2021 | McKie |
| 2021/0237007 | A1 | 8/2021 | Gordon et al. |
| 2023/0027441 | A1 | 1/2023 | Hyseni |
| 2023/0077333 | A1 | 3/2023 | Cox et al. |
| 2024/0218883 | A1 | 7/2024 | Wang et al. |

FOREIGN PATENT DOCUMENTS

| | | | |
|---|---|---|---|
| CN | 102351285 | A | 2/2012 |
| CN | 101913724 | B | 7/2012 |
| CN | 103224277 | B | 3/2014 |
| CN | 103787526 | A | 5/2014 |
| CN | 103395898 | B | 9/2014 |
| CN | 106115897 | B | 2/2019 |
| CN | 109796061 | A | 5/2019 |
| CN | 108585283 | B | 12/2020 |
| EP | 3030343 | B1 | 6/2016 |
| JP | 2010517776 | A | 5/2010 |
| KR | 101874874 | B1 | 7/2018 |
| RU | 183943 | U1 | 10/2018 |
| WO | 2019002951 | A1 | 1/2019 |
| WO | 2021176391 | A1 | 9/2021 |
| WO | 2022112191 | A1 | 6/2022 |

OTHER PUBLICATIONS

Sun, Xun, et al., Effect of the Cavitation Generation Unit Structure on the Performance of an Advanced Hydrodynamic Cavitation Reactor for Process Intensifications, Chemical Engineering Journal 412 (2021) 128600, www.elsevier.com/locate/cej.

Sun, Xun, et al., Investigation on the Characteristics of an Advanced Rotational Hydrodynamic Cavitation Reactor for Water Treatment, Separation and Purification Technology Journal 251 (2020) 117252, www.elsevier.com/locate/seppur.

\* cited by examiner

ADVANCED ROTATIONAL HYDRODYNAMIC CAVITATION SYSTEM FOR THE IRREVERSIBLE REMOVAL OF BACTERIA, PATHOGENS, VIRUSES, AND CHEMICAL BONDS

CROSS-REFERENCE TO RELATED APPLICATIONS

This application claims the benefit of U.S. Provisional Application Ser. No. 63/504,413, filed on May 25, 2023, which is incorporated herein by reference.

TECHNICAL FIELD

The present disclosure relates to hydrodynamic cavitation systems. More particularly, the present disclosure relates to an advanced hydrodynamic cavitation system for the irreversible removal of bacteria, pathogens, viruses, and chemical bonds.

BACKGROUND

Hydrodynamic cavitation is the process of vaporization and bubble implosion which occurs in a flowing liquid as a result of a rapid decrease and subsequent increase in local pressure by means of mechanical constriction. In particular, hydrodynamic cavitation has potential applications in water treatment services to remove bacteria, pathogens, and viruses.

Contaminated liquids, whether it be sludge, wastewater, biosolids, etc., present health risks to humans, animals, and the environment. Hydrodynamic cavitation systems can be used for a multitude of different applications that require disinfection, remediation, treatment, and decontamination of liquids that may also have suspended or heterogeneous solid components. Bacteria, pathogens, viruses, fungi, cyanobacteria, and chemicals are subsets of contaminated water that can be difficult to treat in an economically cost effective and environmentally friendly manner.

Presently, the three most prevalent and mature technologies to kill bacteria in liquid mediums are reverse osmosis, ultraviolet light, and chemicals. These three technologies, however, have their own unique limitations. First, reverse osmosis requires massive inputs of electricity (e.g., 4-19 kWh/m$^3$) at wastewater treatment plants, which makes it a very expensive technology to employ at scale. Second, reverse osmosis wastes three gallons of water for every gallon of treated water. Third, reverse osmosis has a limited temperature range in which it can effectively treat wastewater.

Regarding ultraviolet light technologies, UV lamps have large footprints and cannot be used to remove either salts or metals from contaminated liquids. In addition, both reverse osmosis and ultraviolet techniques require prefiltration to achieve optimal treatment efficiency.

Chemicals are widely used to kill unwanted organisms in water supplies, predominantly sodium hypochlorite, hydrochloric acid, sulfuric acid, nitric acid, and chlorine. These chemicals are bad for the environment due to their toxic nature and byproducts, as well as hazardous for humans to handle.

Accordingly, there is a need for a system that uses less energy than a reverse osmosis plant, conserves clean water, treats any fluid regardless of temperature, works without prefiltration, is capable of breaking chemical bonds, thereby removing heavy metals and salts from contaminated liquids, and is chemical free. The hydrodynamic cavitation system described herein addresses these and other problems.

SUMMARY OF EXAMPLE EMBODIMENTS

In some embodiments, a hydrodynamic cavitation system comprises a housing, a first stator, a second stator, a third stator, and a rotor interposed between the first stator and the third stator. The rotor is substantially circumscribed by the second stator. The hydrodynamic cavitation system may further comprise a drive shaft, a variable speed motor, and a pump. The pump circulates fluid such as water from the fluid inlet through the cavitation apparatus for treatment and to the fluid outlet. The drive shaft and variable speed motor are configured to rotate the rotor.

The first stator, in some embodiments, may comprise a first, external side and a second, internal side. The first, external side of the first stator functions as a front cover to the housing and may comprise an aperture couplable to the fluid inlet. The second, internal side of the first stator may comprise a plurality of indentations around an inner circumference. The plurality of indentations may comprise, without limitation, three or more indentations.

The second stator, in some embodiments, is a circular ring positioned between the first stator and the third stator that substantially circumscribes the rotor. The second stator may be formed from a plurality of ring segments, each segment having a plurality of indentations.

The third stator, in some embodiments, may comprise an internal side and an external side. The external side of the third stator functions as a rear cover to the housing and may comprise an aperture for receiving the drive shaft. The internal side of the third stator may comprise a plurality of indentations around an inner circumference.

The rotor, in some embodiments, may comprise a first side, a second side, and an outer circumference. The first side, second side, and outer circumference may each respectively comprise a plurality of indentations. Each side of the rotor may comprise, without limitation, ten or more indentations. The plurality of indentations on the first side of the rotor are configured to align with and/or be substantially parallel to the plurality of indentations on the internal side of the first stator. The plurality of indentations on the second side of the rotor are configured to align with and/or be substantially parallel to the plurality of indentations on the internal side of the third stator. The plurality of indentations on the outer circumference of the rotor are configured to align with and/or be substantially parallel to the plurality of indentations of the second stator (i.e., assembled indentation ring segments). Cavitation occurs in the gaps and indentations between the first stator and rotor, between the second stator and rotor, and between the third stator and rotor.

DETAILED DESCRIPTION OF EXAMPLE EMBODIMENTS

Figure 1:
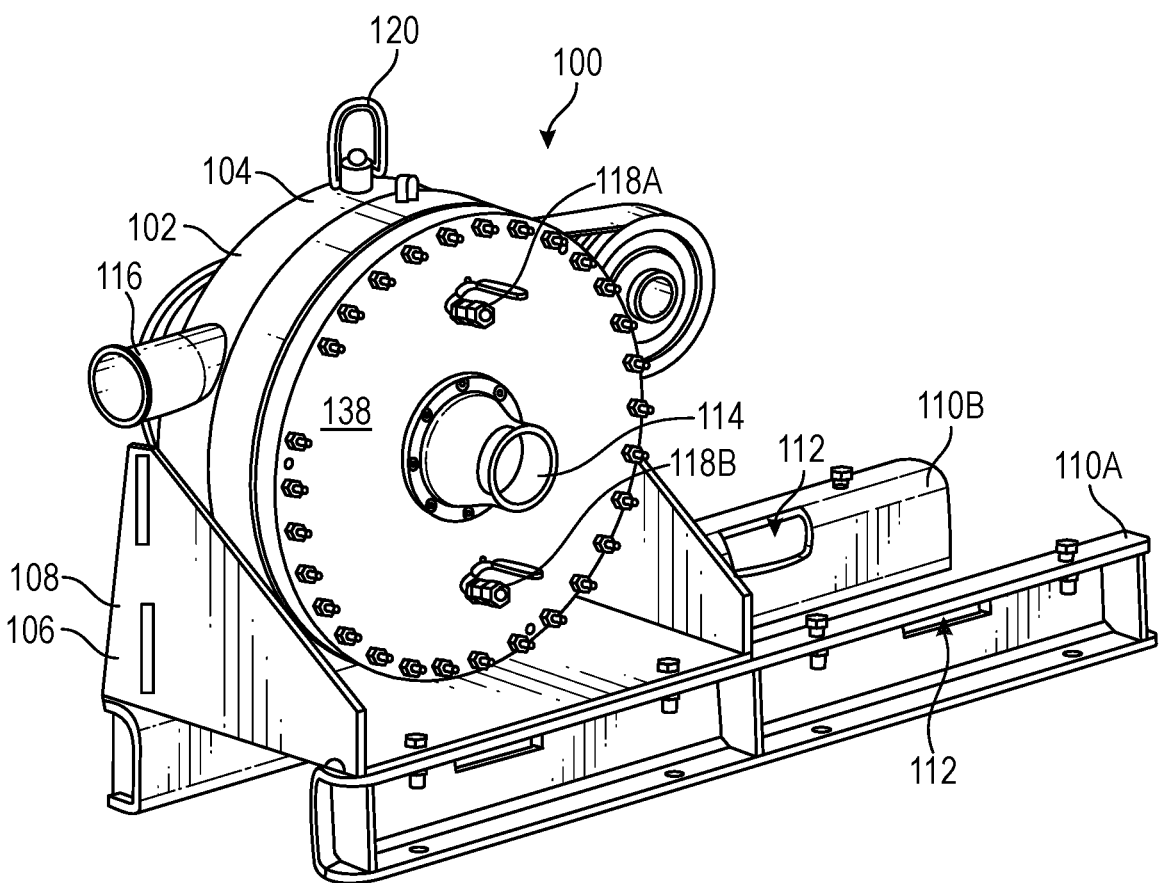
FIG. 1 illustrates a front, side perspective view of a hydrodynamic cavitation system.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Reference to the drawings is done throughout the disclosure using various numbers. The numbers used are for the convenience of the drafter only and the absence of numbers in an apparent sequence should not be considered limiting and does not imply that additional parts of that particular embodiment exist. Numbering patterns from one embodiment to the other need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As previously discussed, there is a need for a device with a small footprint that can break chemical bonds, thereby removing heavy metals and salts, among other things, from water. The present disclosure solves these and other problems.

As illustrated in FIG. 1, in some embodiments, a hydrodynamic cavitation system 100 comprises a cavitation apparatus 102 that includes a housing 104. The housing 104 may be symmetrical or asymmetrical and manufactured from a variety of materials, such as steel, aluminum, fiberglass, plastics, carbon fibers, etc. The housing 104 may comprise a base 106 featuring support walls 108 couplable to beams 110A-B having one or more securing apertures 112 so as to be coupled to another object or surface for transportation and/or installation.

As depicted, though without limitation to the locations specified in the figures, the housing 104 may comprise a fluid inlet 114 on a front surface of the housing 104 and a fluid outlet 116 on side surface of the housing 104. Fluids such as wastewater, blackwater, greywater, etc. may be circulated via a pump (not shown) through the fluid inlet 114 for treatment within the cavitation apparatus 102 before being expelled via the fluid outlet 116. The housing 104 may comprise one or more pressure relief valves 118A-B, though not required, configured to control or limit the pressure within the cavitation apparatus 102 and provide an auxiliary passage for pressurized fluids to be diverted when built up in excess. The pressure relief valves 118A-B may be manually opened or otherwise configured to automatically open at a predetermined set pressure to protect the cavitation apparatus 102 and related equipment from being subjected to pressures that exceed their design limits. The housing 104 may further comprise a dedicated lift point 120 such as a steel hoist ring that enables a user to lift and manipulate the cavitation apparatus 102 into place.

Figure 2:
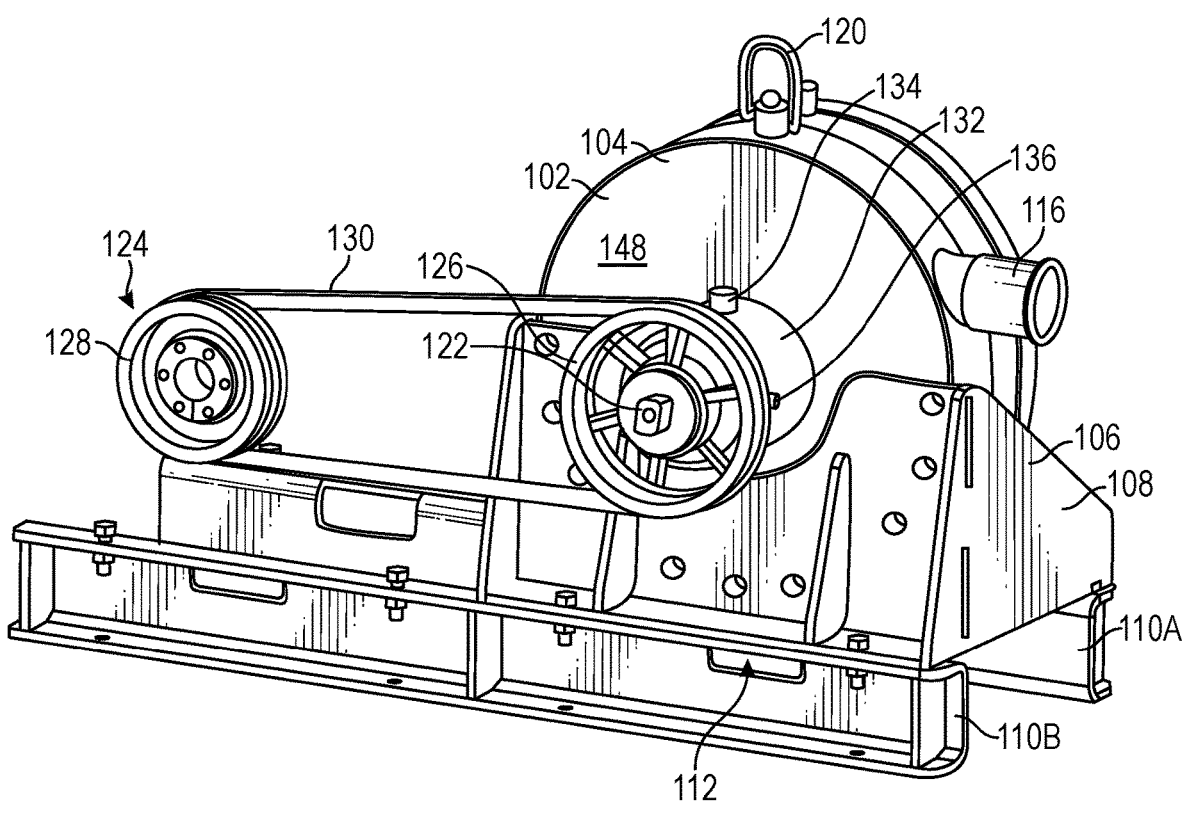
FIG. 2 illustrates a back, side perspective view of a hydrodynamic cavitation system.

As illustrated in FIG. 2, in some embodiments, the hydrodynamic cavitation system 100 comprises a driveshaft 122 positioned within a channel that extends along a longitudinal axis of the cavitation apparatus 102. The driveshaft 122 may be couplable to a belt drive system 124 having a first pulley 126 with a first diameter positioned adjacent to a second pulley 128 with a second diameter, wherein the first pulley 126 and the second pulley 128 are aligned adjacent to the housing 104. A belt 130, cable, or chain is coupled around a circumference of each of the first and second pulleys 126, 128 and is configured to rotate and thereby rotate the driveshaft 122.

The belt drive system 124, in some embodiments, may be coupled to a variable speed motor, engine, or other power source, not depicted herein. The belt drive system 124 transmits power from the variable speed motor to rotational motion of the driveshaft 122. A quick disconnect bushing 123 may be couplable between the first pulley 126 and the driveshaft 122 to increase a clamping force against the driveshaft 122. Likewise, a bearing housing 132 may comprise a bearing assembly 133 having a bearing preload ring may that circumscribe the driveshaft 122 to add a sustained axial load, independent of external loads, to a plurality of ball bearings, thereby ensuring constant contact between the ball bearings and corresponding bearing races therein. The bearing housing 132 may further comprise a breather vent 134, similar in function to the pressure release valves, and high visibility sights for dark liquid 136. While an exemplary embodiment of the belt drive system 124 is provided, it will be understood by one skilled in the art that alternative drive mechanisms and configurations thereof may be employed to power the hydrodynamic cavitation system 100 without departing from the teachings herein.

Figure 3:
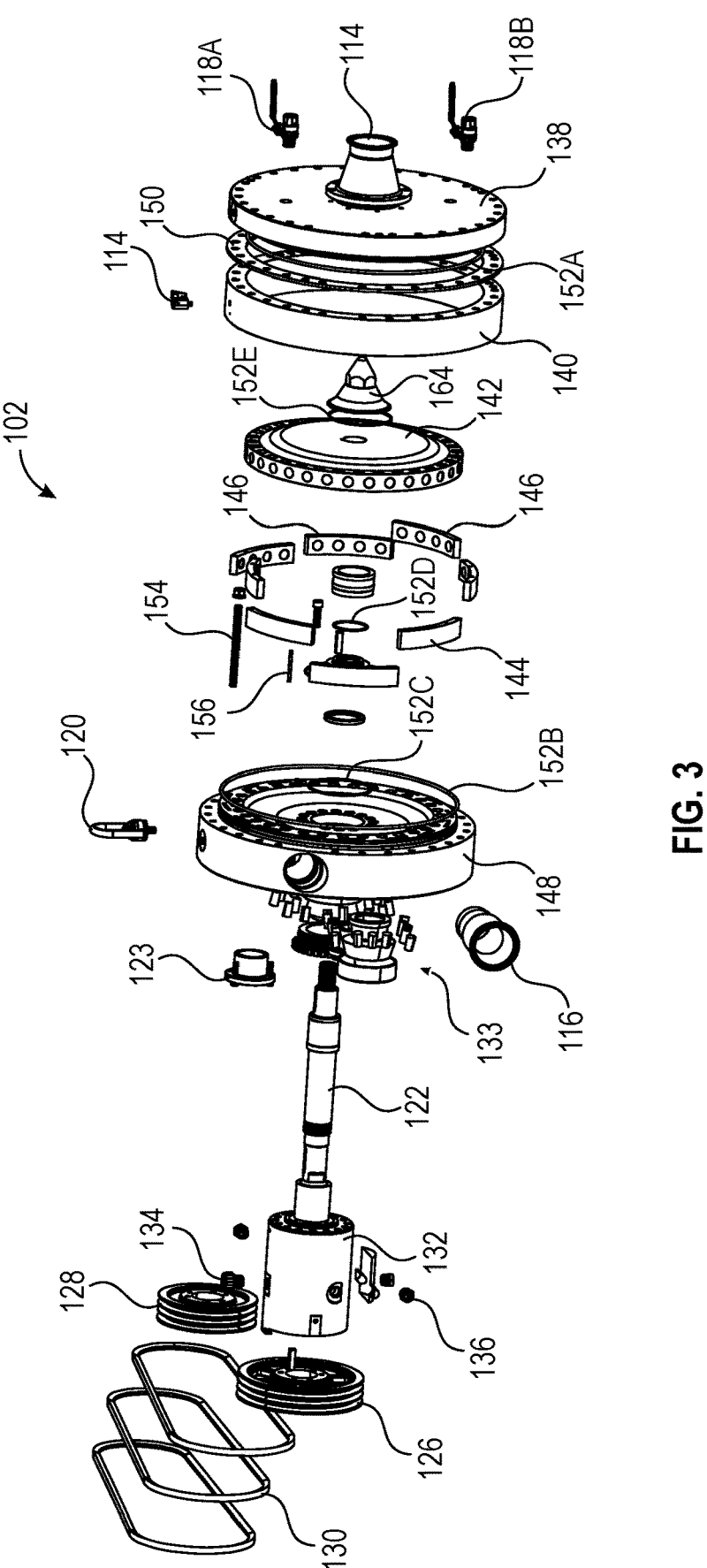
FIG. 3 illustrates an exploded side perspective view of a hydrodynamic cavitation system.
Figure 4:
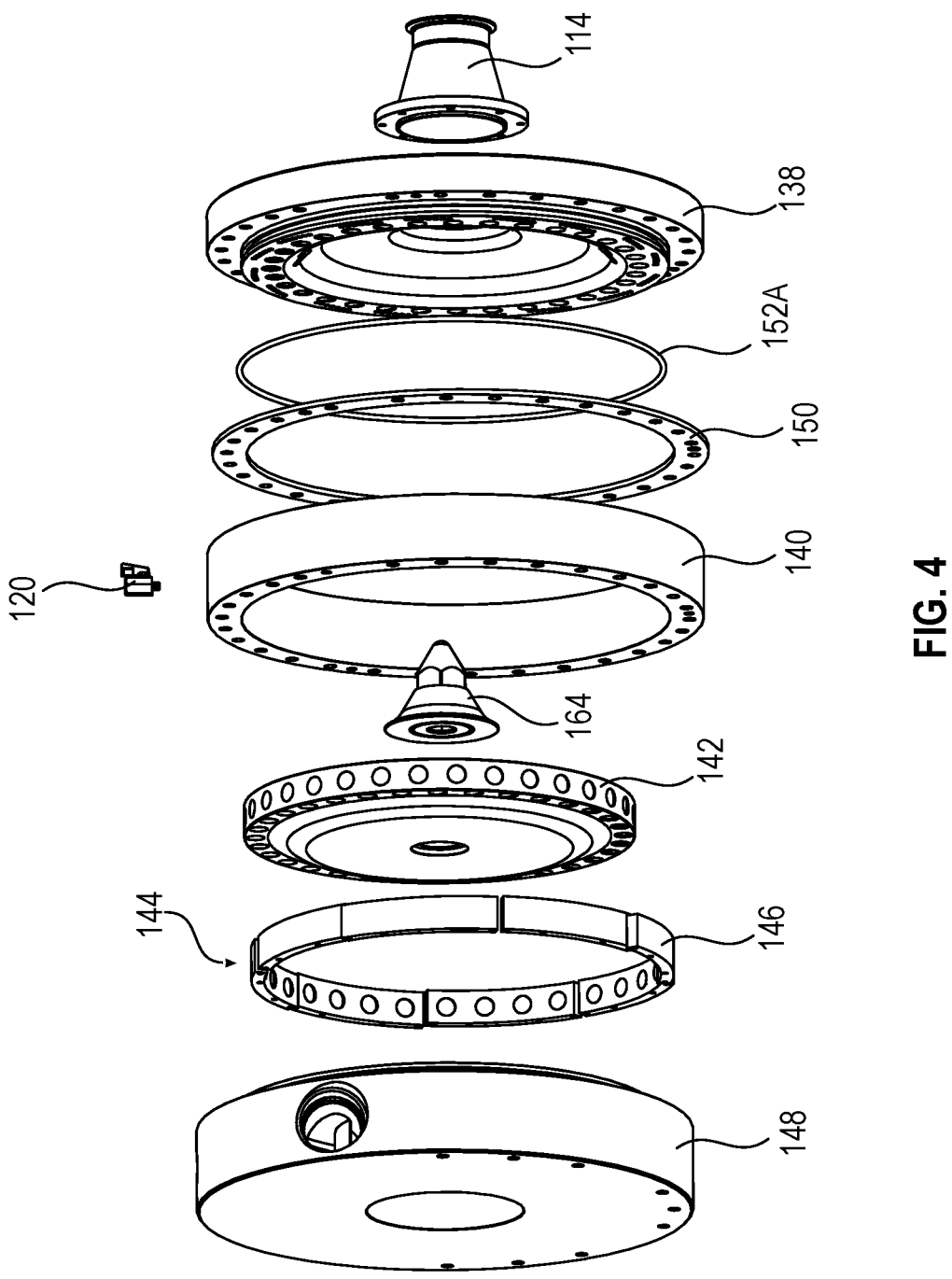
FIG. 4 illustrates an exploded side perspective view of the cavitation apparatus.
Figure 5:
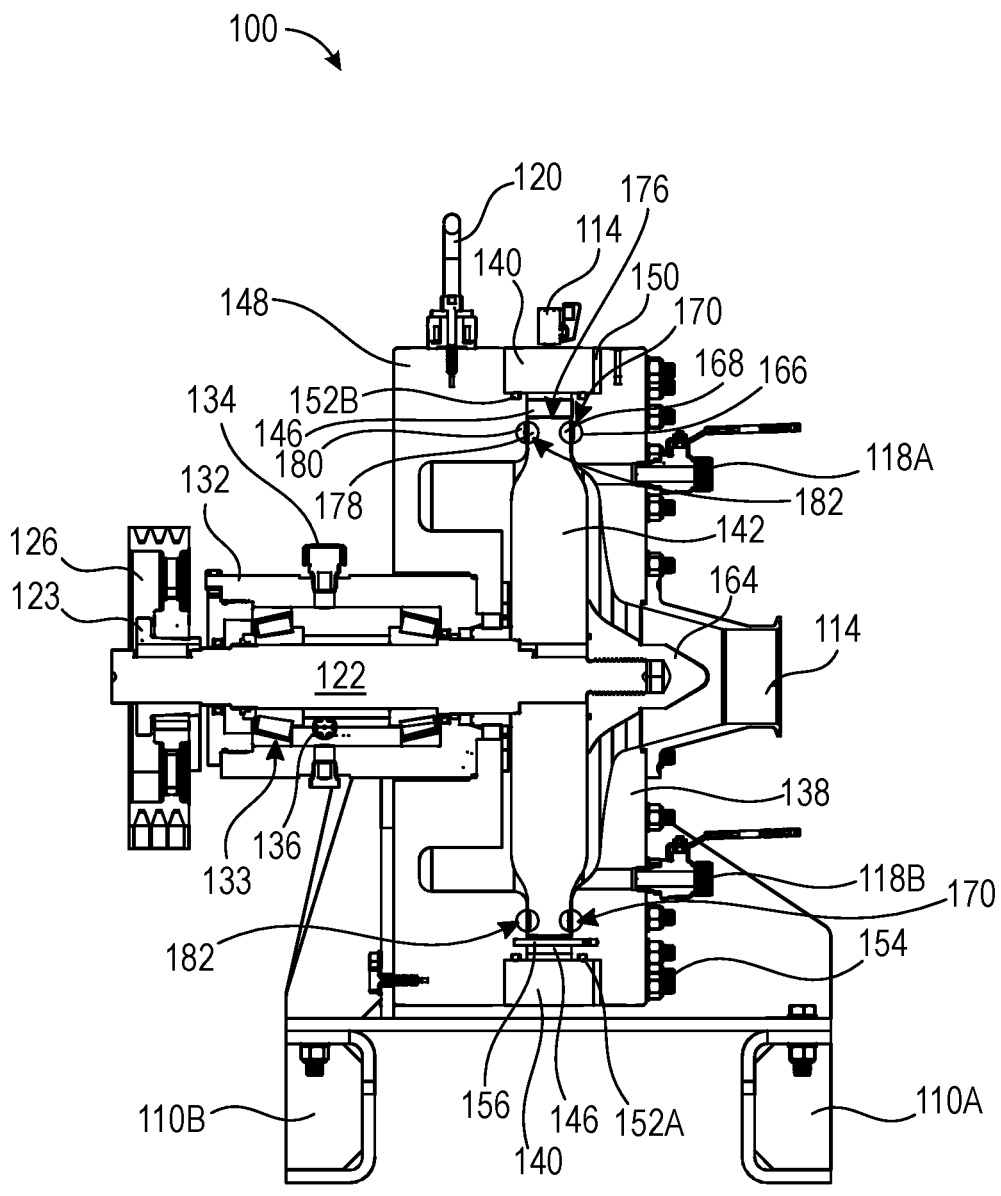
FIG. 5 illustrates a side elevation cross-sectional view of a hydrodynamic cavitation system.

In some embodiments, as shown in FIGS. 3-5, the cavitation apparatus 102 comprises a first stator 138, which also functions as a front cover of the housing 104, a center cover 140, a rotor 142, a second, center stator 144 formed from a plurality of ring segments 146, and a third, rear stator 148, which also functions as a back cover of the housing 104. The rotor 142 is interposed between the first stator 138 and the third stator 148, and is substantially circumscribed by the assembled second stator 144. The center cover 140 circumscribes the second stator 144 and is interposed between the first stator 138 and third stator 148. In other words, the first stator 138, center cover 140, and third stator 148 form the housing 104.

Figure 6:
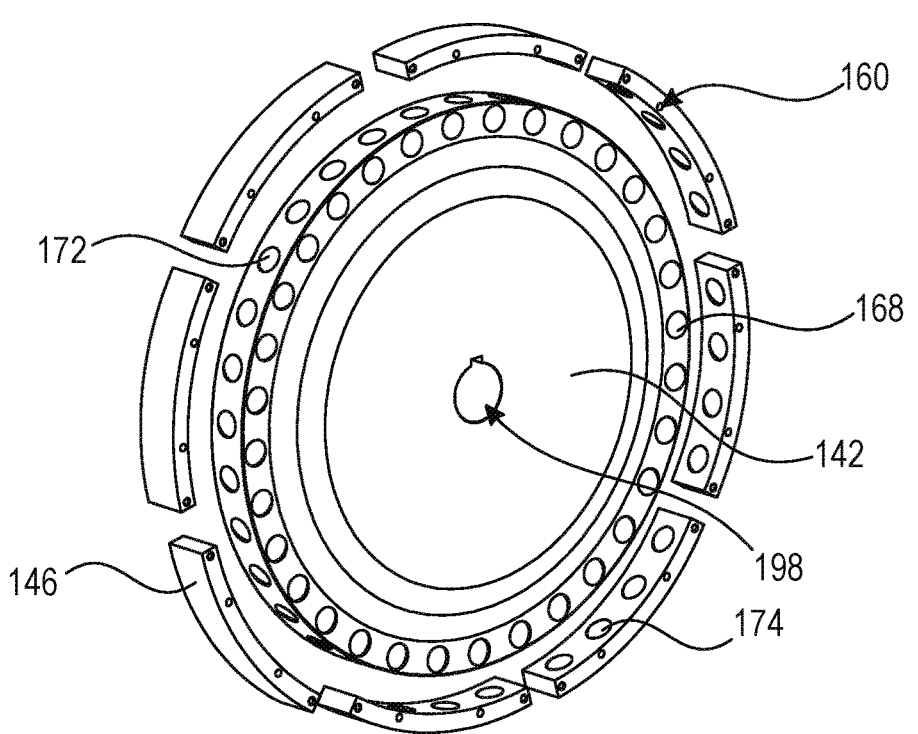
FIG. 6 illustrates a front, side perspective view of a rotor and outer indentation rings separated therefrom.
Figure 7:
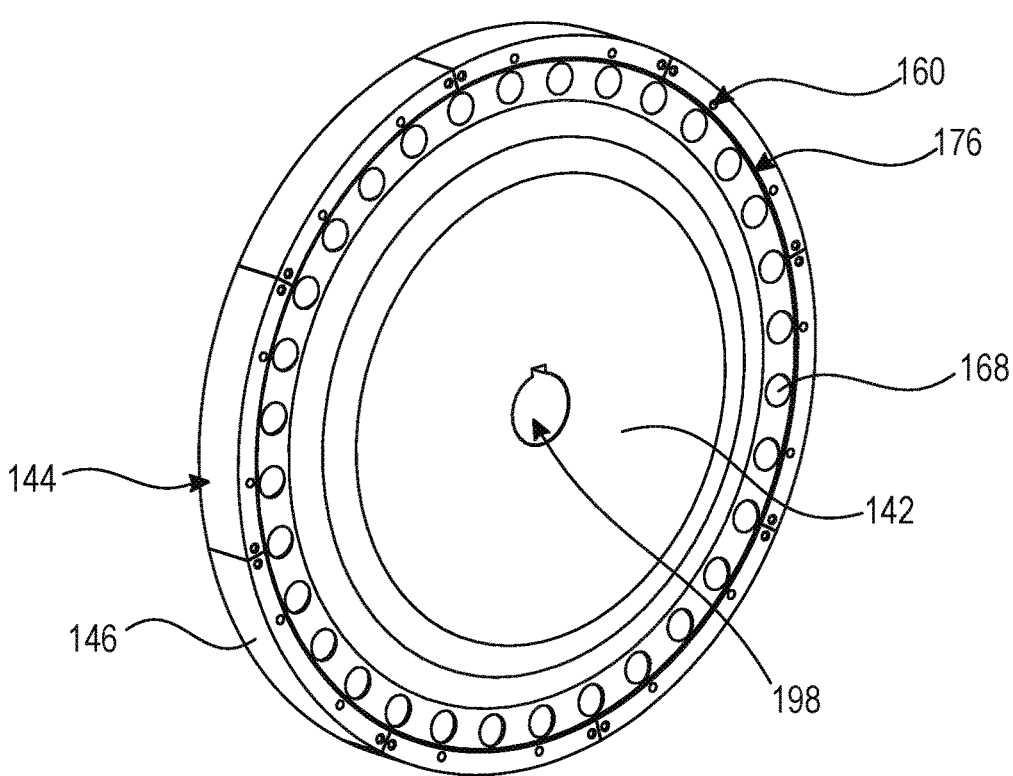
FIG. 7 illustrates a front, side perspective view of a second stator coupled around the rotor.

A spacer 150 may be interposed between the center cover 140 and the first stator 138, allowing for customization in the spacing between the first stator 138 and center cover 140, which likewise adjusts the space between the first stator 138 and the rotor 142. To further adjust the spacing between the first stator 138 and third stator 148, a plurality of dowel pins 156 may be used. For example, a dowel pin 156 may be inserted into a respective rear dowel aperture 158 (best seen in FIG. 12), pass through a respective indentation ring dowel aperture 160 (best seen in FIG. 6), and into a respective front dowel aperture 162 (best seen in FIG. 9). The length of the dowel pins 156 determine the spacing between the respective stators 138, 148. In some embodiments, the distance between each stator may be in a range from 0.1 mm-50.0 cm. However, it will be appreciated that other distances may be used without departing herefrom. Accordingly, the distance between the stators 138, 148 and rotor 142 may be adjusted according to the desired level of treatment appropriate to properties of the contaminated fluids being treated. It will be also appreciated that one or more O-rings 152A-E or other seals may be used between the various components. Further, the third rotor 148 may couple to the center cover 140, spacer 150, and first stator 138 via bolts 154 or other securing mechanisms.

As best seen in FIG. 5, the driveshaft 122 passes through the bearing housing 132, through the rear of the third stator 148, and through the rotor 142. A nose cone 164 is coupled to the front side of the rotor 142 and receives an end of the driveshaft 122 therein (e.g., thread couplable). As a result, when the driveshaft 122 rotates, the rotor 142 likewise rotates. In some embodiments, though without limitation, a speed of the rotor 142, as actuated by the driveshaft 122, ranges from 500-10,000 RPM, and is driven via indirect or direct drive from the variable speed motor with horsepower ranging from 10-100 HP.

A plurality of cavitation sites are formed by indentations in the first stator, rotor, center stator, rotor, and rear stator. For example, as shown in FIG. 5, front indentations 166 of the first stator 138 align with front side rotor indentations 168, forming first cavitation sites 170. Outer diameter rotor indentations 172 (best seen in FIG. 6) align with center stator indentations 174, creating second cavitation sites 176. Rear side rotor indentations 178 align with third stator indentations 180, creating third cavitation sites 182. The distance between each respective stator 138, 144, 148 and the rotor 142 may be in a range from 0.1 mm to 50.0 cm, which likewise means that each indentation 166, 168, 172, 174, 178, 180 has a distance to each respective opposite indentation in a range from 0.1 mm to 50.0 cm. The indentation sizes and depths may range from 5.0 mm to 20.0 cm, although other ranges are contemplated. The indentation geometries can be conical, cylindrical, or spherical in shape, among others. Each indentation 166, 168, 172, 174, 178, 180, in some embodiments, may comprise an attack angle between 0-60 degrees, although it will be appreciated that said attack angle is not required. While 0-60 degrees is preferred, other ranges are contemplated. While center stator indentations 174 are shown, they are not required.

Each cavitation site 170, 176, 182 is capable of generating extreme temperatures, reaching 4500° C. In other words, the implosion of bubble cavities at localized areas (e.g., each cavitation site 170, 176, 182) yields turbulence, high temperature hotspots up to 4500° C., high pressures up to 1000 bar, oxidation, free radicals, shear forces, and shock waves. These disruptive and dynamic changes can be destructive to microorganisms in liquid, causing cells to lyse. By having ten or more cavitation sites 170, 176, 178 (in other words, each pairing of indentations 166, 168, 172, 174, 178, 180 create a cavitation site, so the plurality of indentations 166, 168, 172, 174, 178, 180 on each surface create a plurality of cavitation sites), the hydrodynamic cavitation volume increases, increasing efficiency by increasing cavitation locations which can coalesce to become a macro cavitation site and cavitation cloud. In a preferred embodiment, there are at least ten cavitation sites 170, ten cavitation sites 176, and 10 cavitation sites 178. However, it will be appreciated that more, or fewer, than ten cavitation sites may be used without departing herefrom.

Figure 8:
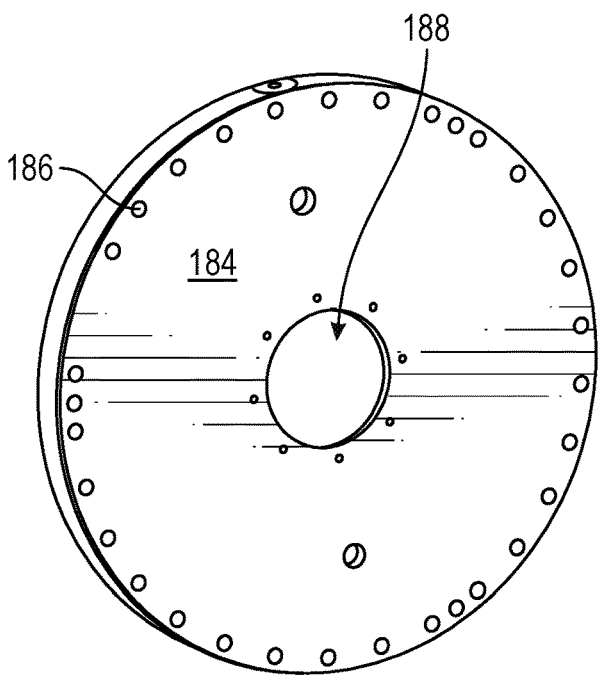
FIG. 8 illustrates a front, perspective view of a first stator.
Figure 9:
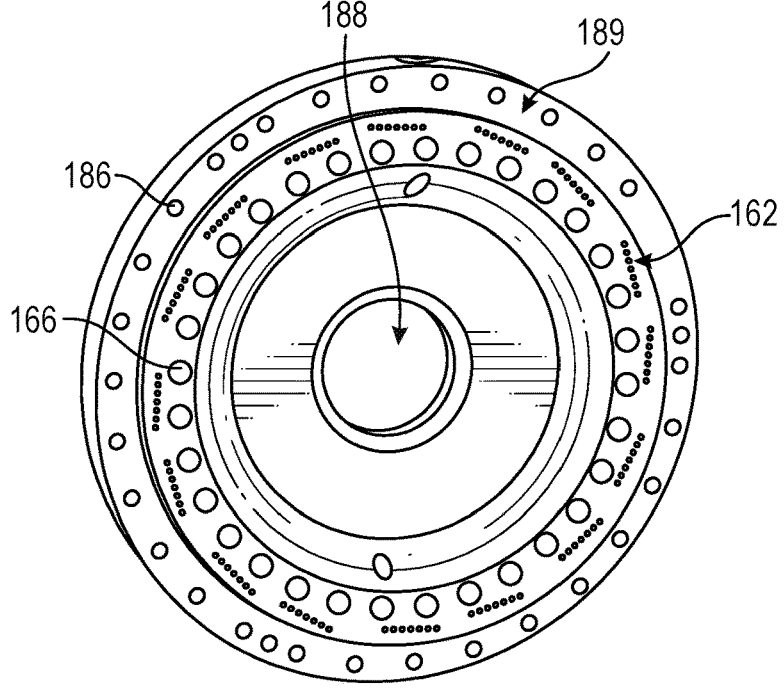
FIG. 9 illustrates a back, side perspective view of a first stator.

As shown in FIGS. 8-9, the first stator 138 comprises, in some embodiments, an external side 184 comprising a plurality of bolt apertures 186 for receiving bolts 154, and inlet aperture 188. FIG. 9 illustrates the internal side 189, which comprises front dowel apertures 162, and front indentations 166.

Figure 10:
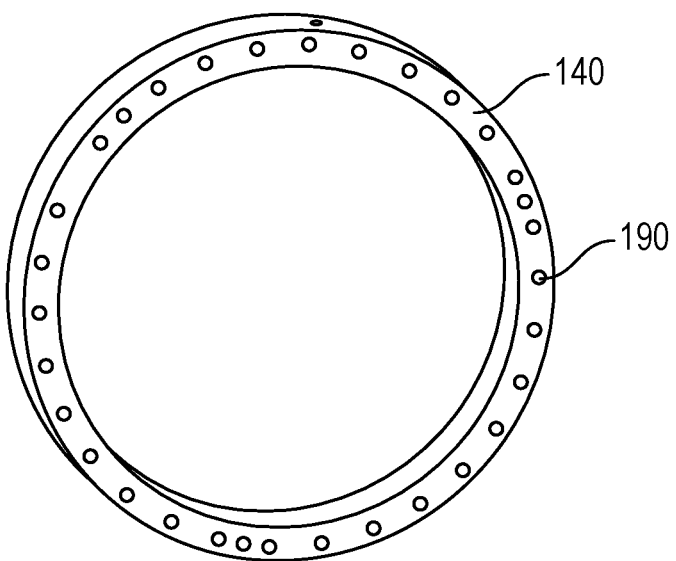
FIG. 10 illustrates a front, perspective view of a center cover.
Figure 11:
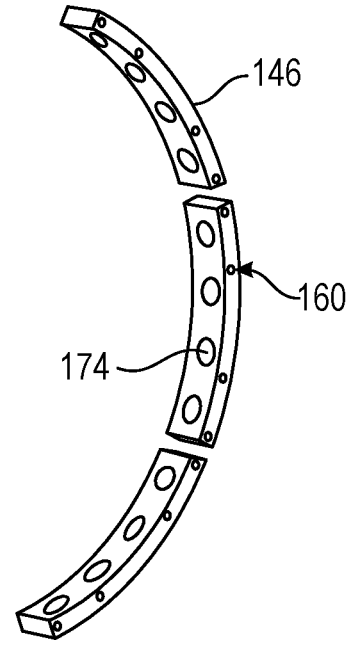
FIG. 11 illustrates a several outer indentation rings.

FIG. 10 illustrates the center cover 140, which comprises bolt apertures 190 for receiving bolts 154. FIG. 11 shows various indentation ring segments 146 decoupled. It will be appreciated that while eight segments 146 are shown in the drawings to form the center stator 144, other lengths and numbers of segments may be used. Although not shown, in some embodiments, the center stator 144 may be made from a single continuous ring.

Figure 12:
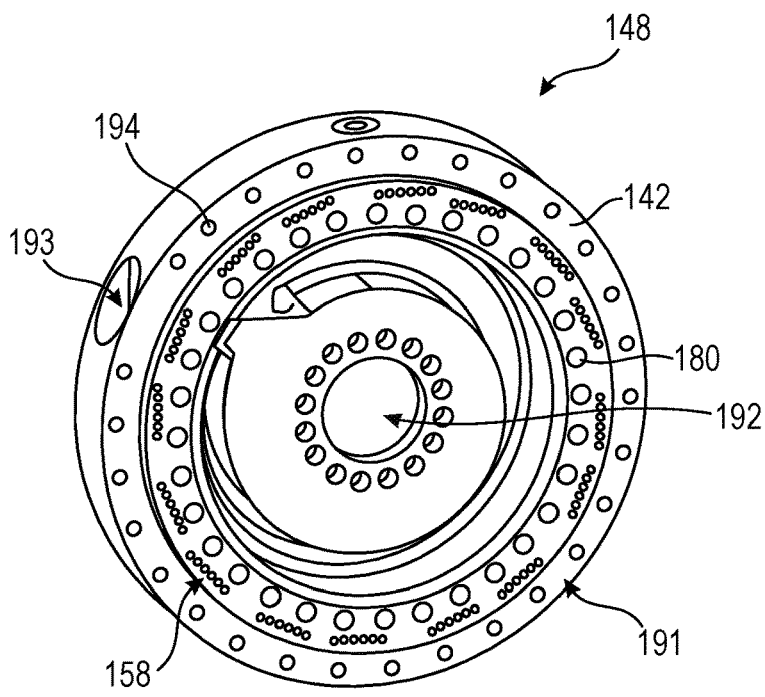
FIG. 12 illustrates a front, side perspective view of a third stator.
Figure 13:
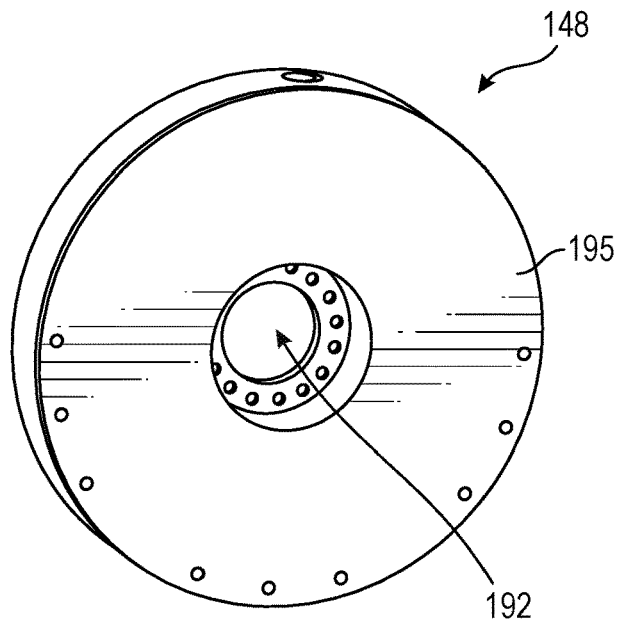
FIG. 13 illustrates a back, side perspective view of a third stator.

FIGS. 12-13 illustrate, in some embodiments, the third stator 148. As shown, the third stator 148 comprises an internal side 191 that comprises rear dowel apertures 158, third stator indentations 180, shaft aperture 192, fluid outlet aperture 193, and bolt apertures 194 for receiving bolts 154. FIG. 13 illustrates an external side 195.

Figure 14:
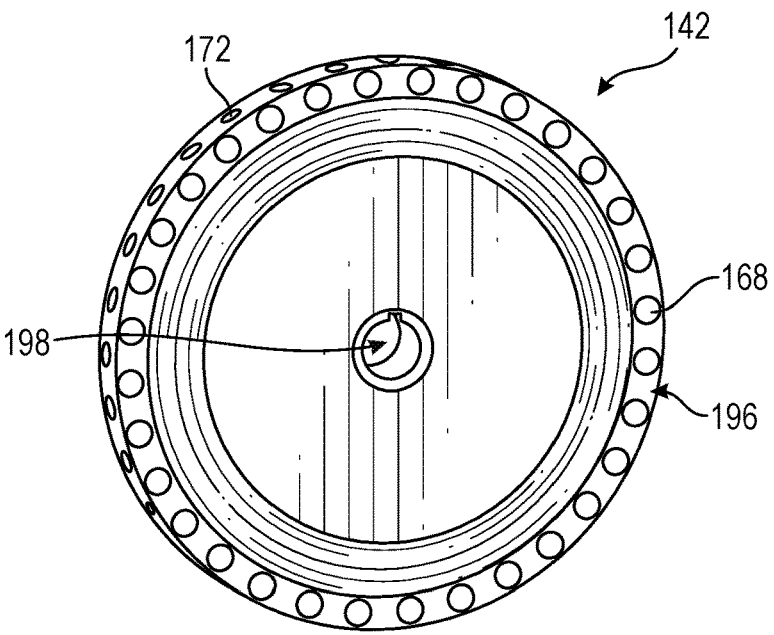
FIG. 14 illustrates a front, side perspective view of a rotor.
Figure 15:
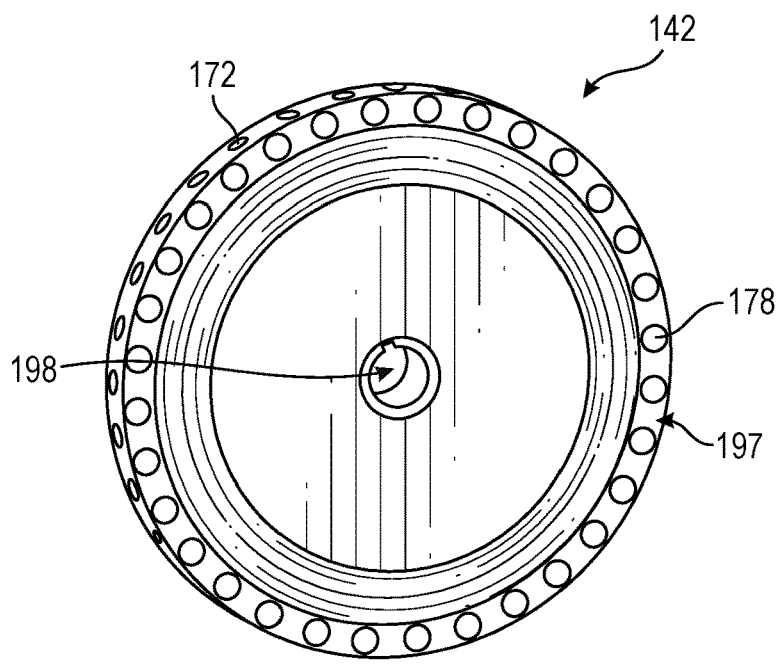
FIG. 15 illustrates a back, side perspective view of a rotor.

In some embodiments, as shown in FIGS. 14-15, a rotor 142 comprises a first side 196 and a second side 197. The first side comprises front side rotor indentations 168 and the second side comprises rear side rotor indentations 178. The rotor 142 further comprises outer diameter rotor indentations 172, and shaft aperture 198.

Accordingly, liquid in need of treatment enters through the inlet 114. As the rotor 142 rotates, hydrodynamic cavitation occurs at the numerous cavitation sites 170, 176, 182. It will be appreciated that a single cavitation site emits temperatures close to 4500° C. The temperature required to break the bond energy of most schedule I-V drugs through thermal decomposition is 300-500° C., which is far below the temperature that is created by a single cavitation site. This extreme temperature removes bacteria, pathogens, viruses, as well as breaks chemical bonds, effectively treating water and other contaminated fluids. As a result, the hydrodynamic cavitation system 100 very effectively disposes of nearly all organic and inorganic compounds, including harmful algal blooms, biomedical waste, and forever chemicals (e.g., perfluoroalkyl and polyfluoroalkyl substances) using the thermal decomposition, shear forces, and shock waves from the cavitation. The resultant liquid has been studied for several schedule II drugs. Research shows the remaining compounds are not toxic and, at worst, create gray water, which can be disposed of relatively easily. Therefore, fluids that pass through the hydrodynamic cavitation system 100 are thoroughly treated beyond the limitations of ultraviolet light and reverse osmosis techniques.

By utilizing a plurality of indentations 166, 168, 172, 174, 178, 180 on each respective component, there are a plurality of cavitation sites 170, 176, 182 at each component interface, respectively, in which to optimize hydrodynamic cavitation volume, thereby increasing efficiency by increasing cavitation locations, which can coalesce to become a macro cavitation site and cavitation cloud. By contrast, the prior art fails to maximize hydrodynamic cavitation location sites that would enable scalability of water treatment services.

In some methods of use, a pump or valve (not shown) takes the contaminated fluids from a holding tank to the fluid inlet 114. Depending on the contaminated fluids, a continuous mixer, centrifuge, grinder, or similar mechanism may be added inline to the fluid inlet 114 to create a viscosity that fits within the boundary conditions of the hydrodynamic cavitation system 100. The ingoing flow rate, where Q is flow rate, may be controlled using a control valve to restrict a cross-sectional area or by changing a diameter of the fluid inlet 114. A change in average fluid velocity, v, occurs when there is a change in cross-sectional area, A, of the flow: $Q=A*v$. The flow of liquid through the fluid inlet 114 may be monitored using a manual valve or a digital flowmeter.

In some embodiments, hydrogen peroxide or ozone may be added to the contaminated fluids before entering the hydrodynamic cavitation system 100. The means for mixing may comprise a continuous mixer, a centrifuge, a grinder, or similar known means of uniformly mixing the contaminated fluids before the ingoing flow rate is set. In some embodiments, the hydrodynamic cavitation system 100 comprises one or more pressure gauges coupled to the housing 104 which may be near the fluid inlet 114 to monitor the fluid pressure entering the cavitation apparatus 102. As the variable speed motor actuates the driveshaft 122, the rotor 142 spins, creating hydrodynamic cavitation at the plurality of cavitation sites 170, the plurality of cavitation sites 176, and the plurality of cavitation sites 182, thereby treating the entering contaminated water before being expelled through the fluid outlet 116. The plurality of indentations 166, 168, 172, 174, 178, 180 provide pressure fluctuations which lead to bubble implosions as part of the hydrodynamic cavitation process that breaks chemical bonds and eliminates bacteria, pathogens, and viruses.

A liquid sample may be taken from the fluid inlet 114 and from the fluid outlet 116. These samples can then be sent to third party water analysis companies to check for contaminants. For example, analysis reports conducted by water testing facilities show that hydrodynamic cavitation system is capable of removing over 90% of organic and inorganic material from water (i.e., a 90% reduction in organic and inorganic material from water collected at the fluid inlet 114 as compared to water collected from the fluid outlet 116). Total coliform and *E. coli* bacteria have been demonstrated to be removed below minimum detection limits.

The hydrodynamic cavitation system 100 uses only half the energy of a reverse osmosis plant and no water is wasted during the treatment process. Additionally, the hydrodynamic cavitation system 100 can also handle any range of temperature without first subjecting the contaminated fluids to prior filtration, as opposed to reverse osmosis and ultraviolet light treatment techniques. The hydrodynamic cavitation system 100 in this manner addresses the needs in the industry for a physical method that has a low energy cost associated with its operation, is scalable, and does not require any type of pretreatment or prefiltration before usage. The hydrodynamic cavitation system 100 may have a very small footprint (e.g., the rotor 142 may have a diameter of 7.0 cm to 25 cm, although not limited to that range), yet is capable of breaking chemical bonds, resulting in the removal of heavy metals and salts from water, overcoming limitations in the prior art.

It will be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A hydrodynamic cavitation system, comprising:
a first stator comprising a fluid inlet on an external side and a plurality of front indentations on an internal side;
a second stator coupled to the first stator;
a third stator coupled to the second stator, the third stator comprising a plurality of third stator indentations on an internal side, and a fluid outlet;
a rotor rotatably positioned within the second stator, the rotor comprising a plurality of front side rotor indentations on a first side, a plurality of outer diameter rotor indentations, and a plurality of rear side rotor indentations on a second side, wherein:

i) the plurality of front side rotor indentations are aligned, respectively, with the front indentations of the first stator to form a plurality of first cavitation sites, ii) the plurality of outer rotor indentations are aligned with the second stator to form a plurality of second cavitation sites, and iii) the plurality of rear side rotor indentations are aligned, respectively, with the plurality of front side rotor indentations to form a plurality of third cavitation sites; and a driveshaft coupled to the rotor, wherein as the driveshaft rotates, the rotor rotates within the second stator.

2. The hydrodynamic cavitation system of claim 1, wherein the plurality of front side rotor indentations, the front indentations of the first stator, the plurality of outer rotor indentations, the plurality of rear side rotor indentations, and the plurality of front side rotor indentations each comprise an attack angle between 0-60 degrees.

3. The hydrodynamic cavitation system of claim 1, wherein the plurality of front side rotor indentations, the front indentations of the first stator, the plurality of outer rotor indentations, the plurality of rear side rotor indentations, and the plurality of front side rotor indentations each comprise a depth between 5 mm and 20 cm.

4. The hydrodynamic cavitation system of claim 1, wherein the second rotor is formed from a plurality of ring segments.

5. The hydrodynamic cavitation system of claim 4, wherein each ring segment comprises a plurality of center stator indentations on an inner surface, wherein the plurality of outer rotor indentations are aligned, respectively, with the center stator indentations of the second stator to form the plurality of second cavitation sites.

6. The hydrodynamic cavitation system of claim 1, wherein a first gap between the internal side of the first stator and the first side of the rotor measures at or between 0.1 mm and 50.0 cm.

7. The hydrodynamic cavitation system of claim 6, further comprising dowel pins configured to adjust the distance of the first gap.

8. The hydrodynamic cavitation system of claim 1, wherein a second gap between an outer circumference of the rotor and the second stator measures at or between 0.1 mm and 50.0 cm.

9. The hydrodynamic cavitation system of claim 1, wherein a third gap between the second side of the rotor and the internal side of the third stator measures at or between 0.1 mm and 50.0 cm.

10. The hydrodynamic cavitation system of claim 9, further comprising dowel pins configured to adjust the distance of the third gap.

11. A hydrodynamic cavitation system, comprising:

a first stator comprising a fluid inlet on an external side and a plurality of front indentations on an internal side;

a second stator coupled to the first stator, the second stator formed from a plurality of ring segments, each ring segment comprising a plurality of center stator indentations on an inner surface;

a third stator coupled to the second stator, the third stator comprising a plurality of third stator indentations on an internal side, and a fluid outlet;

a rotor rotatably positioned within the second stator, the rotor comprising a plurality of front side rotor indentations, a plurality of outer diameter rotor indentations, and a plurality of rear side rotor indentations, wherein:

i) the plurality of front side rotor indentations are aligned, respectively, with the front indentations of the first stator to form a plurality of first cavitation sites, ii) the plurality of outer rotor indentations are aligned, respectively, with the center stator indentations of the second stator to form a plurality of second cavitation sites, and iii) the plurality of rear side rotor indentations are aligned, respectively, with the plurality of front side rotor indentations to form a plurality of third cavitation sites;

a driveshaft passing through a bearing housing, through the third stator, through the rotor, and into a nose cone coupled to the rotor, wherein rotation of the driveshaft rotates the rotor within the second stator;

a plurality of dowel pins each extending from the third stator, through the second stator, and into the first stator; and a center cover circumscribing the second stator, the center cover interposed between the first stator and third stator.

12. The hydrodynamic cavitation system of claim 11, wherein the plurality of front side rotor indentations, the front indentations of the first stator, the plurality of outer rotor indentations, the center stator indentations, the plurality of rear side rotor indentations, and the plurality of front side rotor indentations each comprise an attack angle between 0-60 degrees.

13. The hydrodynamic cavitation system of claim 11, wherein the plurality of front side rotor indentations, the front indentations of the first stator, the plurality of outer rotor indentations, the center stator indentations, the plurality of rear side rotor indentations, and the plurality of front side rotor indentations each comprise a depth between 5 mm and 20 cm.

14. The hydrodynamic cavitation system of claim 11, wherein a first gap between the internal side of the first stator and the first side of the rotor measures at or between 0.1 mm and 50.0 cm.

15. The hydrodynamic cavitation system of claim 11, wherein a second gap between an outer circumference of the rotor and the second stator measures at or between 0.1 mm and 50.0 cm.

16. The hydrodynamic cavitation system of claim 11, wherein a third gap between the second side of the rotor and the internal side of the third stator measures at or between 0.1 mm and 50.0 cm.

17. A method of using a hydrodynamic cavitation system to treat water, the method comprising:

pumping fluid into the hydrodynamic cavitation system through a fluid inlet for treatment, the hydrodynamic cavitation system comprising a first stator comprising a plurality of indentations, a second stator, a third stator comprising a plurality of indentations, and a rotor comprising a plurality of indentations;

actuating a driveshaft causing rotation of the rotor within the second stator and interposed between the first and third stators, the rotation of the rotor generating hydrodynamic cavitation at a plurality of cavitation sites; and outputting processed fluid through a fluid outlet.

18. The method of claim 17, wherein the rotor generates hydrodynamic cavitation:

i. in a first gap between an internal side of the first stator and a first side of the rotor;

ii. in a second gap between an outer circumference of the rotor and the second stator, and iii. in a third gap between the second side of the rotor and the internal side of the third stator.

* * * * *